United States Patent [19]

Sochol

[11] 3,950,505

[45] Apr. 13, 1976

[54] PREPARATION OF MANGANOUS HYDROXIDE

[75] Inventor: Irving Sochol, Baltimore, Md.

[73] Assignee: Diamond Shamrock Corporation, Cleveland, Ohio

[22] Filed: Apr. 28, 1975

[21] Appl. No.: 572,628

[52] U.S. Cl. ............................................. 423/605
[51] Int. Cl.$^2$ ....................................... C01G 45/02
[58] Field of Search ................................... 423/605

[56] References Cited
UNITED STATES PATENTS

| | | | |
|---|---|---|---|
| 2,997,368 | 8/1961 | Barent et al. | 423/605 |
| 3,685,965 | 8/1972 | Kniprath | 423/605 |
| 3,767,780 | 10/1973 | Bellus et al. | 423/605 |

FOREIGN PATENTS OR APPLICATIONS 1,374,975 11/1974 United Kingdom ................. 423/605

OTHER PUBLICATIONS

Moore et al., *Journal of American Soc.*, Soc.,Vol. 72, pp. 858–859, 1950.
Mellor, *Comprehensive Treatise on Inorganic & Theoretical Chemistry*, Mn–volume, Longmans, Green & Co., N.Y., pp. 220–229.

*Primary Examiner*—Herbert T. Carter
*Attorney, Agent, or Firm*—William A. Skinner

[57] ABSTRACT

Manganous oxide is converted directly to manganous hydroxide by hydration in the presence of a catalyst. The product has high purity and reactivity.

11 Claims, No Drawings

PREPARATION OF MANGANOUS HYDROXIDE

FIELD OF THE INVENTION

This invention relates generally to a method for preparing manganous hydroxide, $Mn(OH)_2$, and more particularly to a method for the direct conversion of manganous oxide to the hydroxide.

BACKGROUND OF THE INVENTION

Manganous hydroxide [manganese dihydroxide — $Mn(OH)_2$] is conventionally obtained as a precipitate from manganous salt-containing liquors. These liquors are often produced as by-products from industrial processes, and usually contain various impurities. For example, in the preparation of hydroquinone, aniline is oxidized to benzoquinone using manganese oxides. After separation of the benzoquinone, the resulting liquor may contain manganous sulfate, sulfuric acid, ammonium sulfate, and alkaline earth metal sulfates along with additional impurities from the original manganese ore and from the processing plant. After purification this liquor is treated with aqueous ammonia to precipitate manganous hydroxide, which is normally highly contaminated with sulfates.

It has also been proposed to react solutions containing salts such as manganous halide or sulfate with an alkali metal or alkaline earth metal hydroxide. Under the proper conditions manganous hydroxide is precipitated and may be recovered. However, this method also suffers from the disadvantage that an elaborate purification is necessary to free the product from contamination by the halide or sulfate co-products.

SUMMARY OF THE INVENTION

It has been discovered that manganous hydroxide of high purity can be prepared directly from manganous oxide (MnO) without the introduction of extraneous salts into the reaction or product. The preparation is carried out by adding a catalytically effective amount of a manganese solubilizing agent to an aqueous slurry of manganous oxide, and maintaining the slurry at a temperature above 40°C. until the conversion to manganous hydroxide is essentially complete. As the reaction proceeds, a suspension of finely-divided particles of manganous hydroxide is formed, which may be easily recovered in an extremely pure state.

The pure, finely-divided manganous hydroxide prepared by the method of the invention is quite reactive, and thus lends itself to a variety of applications. For instance, an aqueous slurry of manganous hydroxide may be used as a combustion improver, or reacted with a weak organic acid for incorporation into paint drier formulations. Manganous hydroxide of the invention also may be added directly to process streams as a catalyst, or it may be used as an intermediate in the preparation of other catalytic manganese salts. Further, the material may be used to prepare in a single step high-purity, finely-divided $MnCO_3$ or $Mn_3O_4$.

The method of the invention for the first time provides a direct conversion of manganous oxide to manganous hydroxide, and results in a product which is finely-divided, reactive, and free of contamination from by-product salts.

DETAILED DESCRIPTION OF THE INVENTION

The method of the invention basically involves the hydration of manganous oxide to manganous hydroxide. The hydration apparently proceeds via a dissolution step followed by rapid formation of the hydroxide. It has been discovered that the presence of a manganese solubilizing agent is necessary to catalyze the reaction. The manganese solubilizing agent may be a saturated monobasic organic acid such as acetic acid, an aromatic organic acid such as benzoic acid, a mineral acid such as nitric acid, or the ammonium or manganese salts of these acids.

The hydration reaction sequence can be summarized as:

1. $MnO + 2HX \rightarrow MnX_2 + H_2O$
2. $MnX_2 + 2H_2O \rightarrow Mn(OH)_2 + 2HX$ with the sum of (1) and (2) as
3. $MnO + H_2O \rightarrow Mn(OH)_2$ Although the sequence appears straightforward as written, there are several important parameters which have an effect on its course. One mode of the reaction proceeds via a complete dissolution of manganous oxide, resulting in the precipitation of finely-divided (usually submicron) manganous hydroxide. The manganese solubilizing agent thus must initially be capable of effecting dissolution of the manganous oxide in an aqueous medium. The solubilizing agent further operates to catalyze the hydration through the formation of a soluble salt followed by the rapid formation and precipitation of the hydroxide. The solubilizing agent, after catalyzing the desired reaction, is regenerated as in equation (2) above and is free to enter into subsequent dissolution and hydration reactions.

Another mode of reaction apparently proceeds via a diffusion of the catalytic agent through the manganous oxide particle, without a total disruption of the particle structure. As a result, the manganous hydroxide product is obtained as discrete granular particles of essentially the same size as the original manganous oxide. It follows that any manganese solubilizing agent which interferes with or blocks the desired reaction sequence or either mode of reaction will be unsuitable for use in the method.

While recognition of the principles of the process and the course of the reaction are of primary importance, as opposed to the selection of the specific solubilizing agent employed, several agents have been found particularly effective in the method. These include acetic acid, propionic acid, butyric acid, benzoic acid, nitric acid, and the ammonium or manganese salts of these acids such as ammonium acetate, ammonium butyrate, and manganese nitrate.

The concentration of manganese solubilizing agent necessary to catalyze the reaction may range from about 0.05 molar to about 1.0 molar, with a preferred concentration of about 0.2–0.4 molar in the final liquid phase of the aqueous slurry. The reaction may be carried out at temperatures ranging from about 40°C. up to the boiling point of the reaction mixture. However, it has been found that for most practical operation of the method the hydration should be conducted in the range of 90°–100°C.

If the manganous oxide utilized in the method contains higher valence manganese, i.e. greater than +2 valence, the reaction rate will be inhibited. This phenomenon can be overcome and the hydration rate accelerated by the addition of trace amounts of a reducing agent to the reaction mixture. The amount of reducing agent required to effect an increase in the reaction rate is dependent upon the proportion of higher valence manganese present. If only traces of higher valence manganese (stated as $MnO_2$, calculated from available $O_2$) are present in the manganous oxide, the reaction proceeds smoothly without the addition of a reducing agent. As the concentration of $MnO_2$ increases, the use of a reducing agent greatly facilitates completion of the reaction. If the concentration of $MnO_2$ exceeds about 0.6% by weight, the hydration may be inhibited to such a degree that it is no longer economically practical, even in the presence of excess manganese solubilizing agent.

Most conventional reducing agents are effective, however materials such as hydroxylamine or hydrazine are preferred since the by-products from their use do not contaminate the product. If a reducing agent is required, the amount normally found effective ranges from about 0.01 to about 0.1%.

In the general practice of the invention, manganous oxide having an average particle size in the range of −50 to +100 mesh (0.15–0.3 mm) is combined with an 0.1–0.5 molar aqueous solution of at least one manganese solubilizing agent at 90°–95°C. If higher valence manganese is present, a trace of reducing agent may be added. The slurry is agitated vigorously and the temperature maintained at 90°–100°C. The product manganous hydroxide immediately begins to form as white particles suspended intermixed with the green particles of manganous oxide. As the reaction progresses, the viscosity of the mixture may increase. After about one hour the reaction is generally 90–95% complete, but the reaction mixture may be maintained at the elevated temperature without harm until the hydration is substantially complete. The batch is then cooled, and if the product is in the submicron particle size form, the suspension is filtered through a 325 mesh (0.044 mm.) sieve. The ultrafine manganous hydroxide product passes through the sieve into the filtrate, while any unreacted manganous oxide is retained on the sieve. If the product is in the larger granular form, it is recovered by settling and decantation, or by conventional filtration.

The pure manganous hydroxide product is almost pure white. Since it is extremely reactive, it will oxidize rapidly upon exposure to air and turn to the brownish color of hydrated $Mn_2O_3$. Oxidation may be prevented by maintaining the product in an oxygen-free solution or under vacuum. Depending upon the method used, it may also be necessary to protect the product from oxidation during recovery. This may be accomplished by conventional techniques such as the use of inert atmospheres or oxygen-free solutions.

The invention is further illustrated in the following specific examples.

EXAMPLE 1

One liter of 0.3 molar acetic acid solution was heated to 90°C., the heat source was removed, and 171 grams of manganous oxide (−50 to +100 mesh, containing 0.12% $MnO_2$ calculated from available oxygen) was added with vigorous agitation. An immediate exotherm occurred and the temperature of the mixture rose to 101°C. A fine white suspension of manganous hydroxide also appeared immediately. The temperature of the mixture was then maintained at 97°–100°C. for two hours to insure complete hydration. After cooling, the mixture was filtered through a 325 mesh sieve, leaving a residue of 2.2 grams unreacted manganous oxide on the sieve. This was equivalent to a 98.7% conversion to the hydroxide.

EXAMPLE 2

The method was carried out as in Example 1, with the exception that the manganous oxide starting material contained 0.49% $MnO_2$, and 1.0 ml. of hydrazine hydrate (85%) was added to the acetic acid solution to overcome the inhibiting effect of the higher valence manganese. A 99.1% conversion of MnO to $Mn(OH)_2$ was achieved.

EXAMPLE 3

One liter of 0.3 molar propionic acid solution containing 1.0 ml. of hydrazine hydrate (85%) was heated to 90°C., and 171 grams manganous oxide containing 0.49% $MnO_2$ was added with vigorous agitation. The temperature of the reaction mixture was maintained at 97°–100°C. for two hours. After cooling and filtering through a 325 mesh screen, 0.51 gram unreacted MnO was recovered showing a conversion of 99.4%.

EXAMPLE 4

One liter of solution containing 51 grams ammonium acetate was heated to 90°C., and 0.5 ml. hydrazine hydrate (85%) and 100 grams manganous oxide (average particle size +50 to −100 mesh) were added with vigorous agitation. The mixture was maintained at 90°C. for one hour, then cooled and filtered through a 325 mesh sieve. Recovery of 0.5 gram unreacted MnO indicated a 99.5% conversion to $Mn(OH)_2$.

EXAMPLE 5

To one liter of 5.8% ammonia solution was added 226 grams ammonium nitrate and 450 grams manganous oxide (−50 to +100 mesh). The mixture was agitated and 1.0 ml. of hydrazine hydrate (85%) was added. A reflux condenser was attached to the reaction vessel to minimize loss of ammonia, and the mixture was heated slowly to 90°C. After 4 hours at about 90°C., the reaction mixture was cooled and manganous hydroxide, obtained in the granular form, was allowed to settle out. The supernatant liquor was removed via decantation. The product was repulped with fresh water and separated as before to remove any soluble salts. Alternatively, the product could be filtered, washed, and dried under an inert atmosphere. Conversion to $Mn(OH)_2$ was 99%.

The method of the invention is adaptable not only to batch-type operations, but also may be conducted as a continuous process. In a continuous operation, the conventional process engineering techniques may be used, such as a series of reactors interspersed with settlers or a single contercurrent-flow reactor.

While the invention has been described with particular reference to specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A method for preparing manganous hydroxide comprising the steps of adding at least one manganese solubilizing agent selected from the group consisting of acetic acid, propionic acid, butyric acid, nitric acid, and the ammonium and manganese salts thereof to an aqueous slurry of manganous oxide in an amount sufficient to form a 0.05 to 1.0 molar solution and maintaining the slurry at a temperature between about 40°C. and the boiling point of the solution until the manganous oxide is substantially converted to manganous hydroxide.

2. The method of claim 1 wherein the manganese solubilizing agent is acetic acid.

3. The method of claim 1 wherein the manganese solubilizing agent is propionic acid.

4. The method of claim 1 wherein the manganese solubilizing agent is nitric acid.

5. The method of claim 1 wherein the amount of manganese solubilizing agent added results in the formation of a 0.2 to 0.4 molar solution.

6. The method of claim 1 wherein the slurry temperature is maintained between about 90°C. and about 100°C.

7. The method of claim 1 wherein the slurry is maintained at a temperature above about 40°C. for at least 30 minutes after addition of the manganese solubilizing agent.

8. The method of claim 1 wherein 0.01 to 0.1% of a reducing agent is also added to the aqueous slurry.

9. The method of claim 1 wherein 0.05 to 0.1% of hydrazine is also added to the aqueous slurry.

10. The method of claim 1 wherein the manganous oxide contains up to 0.6% available oxygen expressed as $MnO_2$.

11. A method for preparing manganous hydroxide comprising the steps of adding solid manganous oxide to a 0.2–0.4 molar aqueous solution of at least one manganese solubilizing agent selected from acetic acid, propionic acid, and nitric acid, adding 0.05–0.1% hydrazine, agitating the mixture, maintaining the mixture at a temperature of 90°–100°C. for at least 30 minutes, filtering the mixture to remove unreacted manganous oxide, and recovering manganous hydroxide.

* * * * *